(12) United States Patent
Iwai et al.

(10) Patent No.: US 6,357,775 B1
(45) Date of Patent: Mar. 19, 2002

(54) BOTTOM LINK TYPE FRONT WHEEL SUSPENSION FOR MOTORCYCLE

(75) Inventors: Toshiyuki Iwai; Takanori Aika; Shinji Ito, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,661

(22) Filed: Nov. 30, 1999

(30) Foreign Application Priority Data

Nov. 30, 1998 (JP) .......................................... 10-340781
Nov. 30, 1998 (JP) .......................................... 10-340791

(51) Int. Cl.[7] .......................... B62D 61/02; B62K 11/12
(52) U.S. Cl. ........................................ 280/276; 180/219
(58) Field of Search ................................ 280/276, 277, 280/279, 281.1; 180/219, 227

(56) References Cited

U.S. PATENT DOCUMENTS

| | | | |
|---|---|---|---|
| 1,254,798 A | * | 1/1918 | Harley |
| 3,954,284 A | * | 5/1976 | Phillips et al. ............... 280/277 |
| 4,775,163 A | * | 10/1988 | McGowan et al. .......... 280/277 |
| 5,186,274 A | * | 2/1993 | Hegman ...................... 180/227 |
| 5,899,478 A | * | 5/1999 | Woodside ..................... 280/276 |
| 6,152,472 A | * | 11/2000 | Woodside ..................... 280/277 |
| 6,155,370 A | * | 12/2000 | Iwai et al. .................... 180/222 |
| 6,164,675 A | * | 12/2000 | Pickering ..................... 280/277 |

FOREIGN PATENT DOCUMENTS

| | | | |
|---|---|---|---|
| JP | 60-15744 | | 5/1985 |
| JP | 5-69875 | * | 3/1993 ........... B62K/25/16 |

* cited by examiner

*Primary Examiner*—Avraham H. Lerner

(57) ABSTRACT

To provide a bottom link type front wheel suspension for a motorcycle, which allows accessories such as a headlamp to be easily arranged in front of a front fork. A bottom link type front wheel suspension includes a top bridge and a bottom bridge mounted on upper and lower portions of a steering stem; front forked portions having upper ends mounted on the top and bottom bridges; front wheel supporting arms having front ends vertically swingably connected to the lower ends of the front forked portions; rods having lower ends connected to middle points of the front wheel supporting arms; an arm vertically swingably extending forwardly from the bottom bridge and connected to the upper ends of the rods via a rod hanger; dampers having lower ends connected to the arm; and an upper bracket mounted on the upper portions of the front forked portions and connected to the upper ends of the dampers, wherein the center of the damper substantially corresponds to the center, of the front forked portion.

10 Claims, 15 Drawing Sheets

BOTTOM LINK TYPE FRONT WHEEL SUSPENSION FOR MOTORCYCLE

BACKGROUND OF THE INVENTION

1. Field of the Invention

The present invention relates to a bottom link type front wheel suspension for a motorcycle.

2. Description of Related Art

The front wheel suspension for a motorcycle is generally of a telescopic type or a bottom link type.

The telescopic type front wheel suspension is configured such that a front wheel is directly connected to a body frame by means of a damper. When using the telescopic front wheel suspension for a large-sized motorcycle, a large stroke damper, that is, a large-sized damper is required to obtain a large ascending/descending stroke of a front wheel. When using a small stroke damper, the bottom link type front wheel suspension is relatively superior to the telescopic type front wheel suspension since the stroke of the damper corresponding to the ascending/descending stroke of the front wheel can be decreased by use of the link structure.

The telescopic type suspension has an expandable structure capable of being expanded/contracted just like a telescope, and is suitable for a motorcycle having a relatively small caster angle (angle between vertical line and front fork).

For a motorcycle having a large caster angle, which is so-called an American bike, since the front fork is largely tilted in the horizontal direction, it is difficult to absorb the vertical movement amount of a front wheel by the telescopic suspension from the viewpoint of the mounting angle of the telescopic suspension. In this regard, since the bottom link type suspension is less affected by the caster angle, it is suitable for a motorcycle having a larger caster angle.

A bottom link type front wheel suspension for a motorcycle has been disclosed, for example, in Japanese Utility Model Publication No. Sho 60-15744 entitled "Front Wheel Suspension For Two-Wheeled Vehicle." The above-described related art bottom link type front wheel suspension is classified into a leading arm type shown in FIG. 1 of the above document (hereinafter, referred to as "related art No. 1"), and a trailing arm type shown in FIG. 2 of the above document (hereinafter, referred to as "related art No. 2").

The related art Nos. 1 and 2 will be briefly described below. It should be noted that in the following description, reference characters cited from the above document are used. The related art No. 1 is characterized in that the rear end of a leading arm 3 is connected to the lower portion of a front fork F, and a front wheel W is mounted to the front end of the leading arm 3; and the rear end of a control lever 6 is connected to the front end of a lower bridge Fb and the front end of the control lever 6 is connected to the front end of an upper bridge Fa by means of a damper A. Accordingly, the damper A is protruded forwardly from the front fork F. The related art No. 1 is also characterized in that a middle point of the control lever 6 in the longitudinal direction is connected to a middle point of the leading arm 3 in the longitudinal direction by means of a link 8.

The related art No. 2 is characterized in that the front end of the leading arm 3 is connected to the lower portion of the front fork F and the front wheel W is mounted to the rear end of the leading arm 3, and the front end of the control lever 6 is connected to a middle point of the front fork F and the rear end of the control lever 6 is connected to the front end of the upper bridge Fa by means of the damper A. Accordingly, the upper half of the damper A is protruded forwardly from the front fork F. The related art No. 2 is also characterized in that a middle point of the control lever 6 in the longitudinal direction is connected to a middle point of the leading arm 3 in the longitudinal direction by means of a link 8.

The related art No. 1 is problematic in that since the damper A is protruded forwardly from the front fork F as described above, a space for disposing the damper A is required to be provided in front of the front fork F. This results in that arrangement of a headlamp, a meter and the like in front of the front fork F is restricted in design. The same is true for the related art No. 2.

It may be considered to dispose the damper A at the back of the front fork F, however, in this case, a fuel tank and the like are accommodated at the back of the front fork F, presenting the same restriction in design.

FIG. 15 is a view, equivalent to FIG. 2 of the above document, illustrating the principle of the related art typical bottom link type suspension. Reference numerals are newly appended to the elements in FIG. 15.

One end of a front wheel supporting arm 102 is swingably mounted to the lower end of a front forked portion 101; an axle 104 of a front wheel 103 is mounted to the leading end of the front wheel supporting arm 102, a push rod 105 is erected from a middle point of the front wheel supporting arm 102; the upper portion of the push rod 105 is connected to another link 106 extending from the upper portion of the front forked portion 101; and the leading end of the link 106 is connected to the lower ends of a suspension spring 107 and a hydraulic damper (not shown). With this configuration, the front wheel 103 is suspended from a parallel link structure, and when the front wheel 103 is moved up or down, the axle 104 is moved from a position (1) to a position (2) or from the position (1) to a position (3).

With the above parallel link structure, the motion of the link 106 desirably follows the motion of the front wheel supporting arm 102, that is, the motion of the axle 104, and accordingly, the axle 104 can be desirably supported by the suspension spring 107 to which the leading end of the link 106 is connected. On the other hand, in the above parallel link structure, since the upward motion of the axle 104 simply corresponds to the compression motion of the suspension spring 107, the characteristic of the suspension spring 107 must be simply determined depending on the motion of the axle 104. This causes a problem in that the degree of freedom in design of the suspension spring 107 becomes poor.

Furthermore, to keep the parallel link structure, the push rod 105 must be disposed in such a manner as to be substantially in parallel with the front forked portion 101 and to be made as apart from the front forked portion 101 as possible. Accordingly, when a vehicular body is viewed from a side surface thereof, the push rod 105 becomes conspicuous, with a result that the external appearance of the front wheel suspension is degraded. To cope with such an inconvenience, it is required to adopt a structure shown in FIG. 15 in which a protrusion member 108 is provided in front of the upper portion of the front forked portion 101 while the push rod 105 is made as close to the front forked portion 101 as possible. Consequently, as shown in FIG. 2 of the above document, the front forked portion must be designed to have a complicated triangular structure.

SUMMARY OF THE PRESENT INVENTION

An object of the present invention is to provide a bottom link type front wheel suspension capable of allowing accessories such as a headlamp and a meter to be easily arranged in front of a front fork. Furthermore, an object of the present invention is to provide a front wheel suspension for a two-wheeled vehicle, which is capable of enhancing the external appearance of the front wheel suspension without complicating a structure of a front fork and its vicinity by improving a link structure, and also enlarging the degree of freedom of the suspension spring.

To achieve the above object, according to a first aspect of the present invention, there is provided a bottom link type front wheel suspension for a motorcycle, characterized in that: a steering stem is rotatably mounted in a head pipe; a top bridge and a bottom bridge are mounted on upper and lower portions of the steering stem, respectively; upper ends of front forked portions are mounted to the top and bottom bridges; one-ends of front wheel supporting arms are connected to lower ends of the front forked portions; lower ends of rods are connected to middle points of the front wheel supporting arms; an arm vertically swingably extending forwardly from the bottom bridge is connected to the upper ends of the rods; lower ends of dampers are connected to the arm; and the upper ends of the dampers are connected to the top bridge side; wherein the center of the damper substantially corresponds to the center of the front forked portion in a side view.

In the above bottom link type front wheel suspension, the arm swingably extends forwardly from the bottom bridge, and the lower ends of the dampers are connected to the arm and the upper ends of the dampers are connected to the top bridge side; and further, the center of the damper substantially corresponds to the center of the front forked portion in a side view.

Accordingly, the dampers are not protruded forwardly from the front forked portions in the range of the swing angle of the arm, with a result that a space remains in front of the front forked portions and accessories such as a headlamp and a meter can be arranged in the space.

According to a second aspect of the present invention, there is provided a front wheel suspension for a two-wheeled vehicle, characterized in that: front wheel supporting arms are swingably mounted to front forked portions; an axle of a front wheel is mounted to leading ends of the front wheel supporting arms; push rods are erected from middle points of the front wheel supporting arms, upper ends of the push rods are connected to one end or in the vicinity of an upper link disposed near a bottom bridge; the other end of the upper link is swingably mounted to the bottom bridge; and the upper link is connected to the lower end of a suspension spring, whereby when a vehicular body is viewed from the side surface thereof, one end of the upper link extends to a position substantially overlapped with the front forked portions, and thereby each of the front supporting arms, each of the push rods, and the upper link constitute a Z-shaped link.

The front wheel suspension, which is basically of a bottom link type, has a Z-shaped link structure including each of the front wheel supporting arms, each of the push rods, and the upper link. Accordingly, it is possible to make the upper portion of the push rod closer to the front forked portion, and hence to improve the external appearance of the front wheel suspension without complicating the structure of the front forked portion and its vicinity.

Furthermore, since the front wheel suspension has the Z-shaped link structure, it is possible to freely select the lengths, mounting postures, and the relative angles of the constituents, and hence to increase the degree of freedom in design of the suspension spring.

According to a third aspect of the present invention, in addition to the configuration of the second aspect of the present invention, a pivot for mounting the front wheel supporting arm to the front forked portion is offset to the rear wheel side from the center of the front forked portion.

Since the pivot of the front forked portion is offset to the rear wheel side, the lower portion of the push rod can be separated from the front forked portion to ensure a space for containing a part constituting the front wheel suspension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, one embodiment of the present invention will be described with reference to the accompanying drawings.

In these drawings, the "front," "rear," "left," "right," "upper,", and "lower" sides are based on the driver's viewing direction. Furthermore, the drawings should be viewed in the direction of characters.

Figure 1:
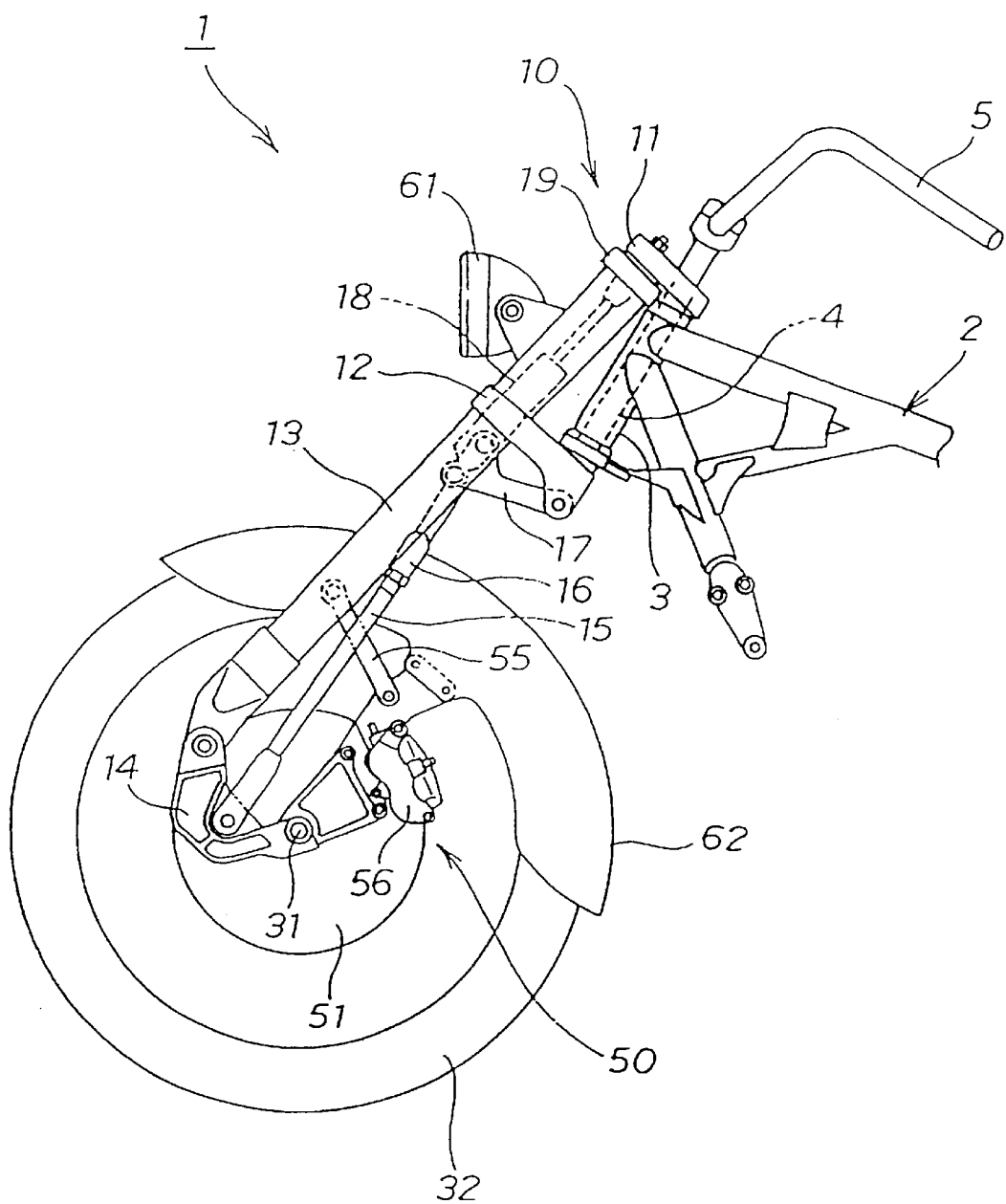
FIG. 1 is a side view of the front half of a motorcycle to which the present invention is applied.

FIG. 1 is a side view of a front half of a motorcycle according to the present invention. A motorcycle 1 is configured such that a vertical steering stem 4 is mounted in a head pipe 3 of a body frame 2 in such a manner as to be rotatable in right and left directions. A top bridge 11 to be described later is mounted to the upper portion of the steering stem 4. A handlebar 5 is mounted to the top bridge 11. Furthermore, a bottom link type front wheel suspension 10 is mounted to the steering stem 4.

A front brake 50 of the motorcycle 1 is a hydraulic disk brake including a brake disk 51 mounted to a side portion of a front wheel 32 and a caliper 56 for controlling the braking action of the brake disk 51. In FIG. 1, reference numeral 61 designates a headlamp.

Figure 2:
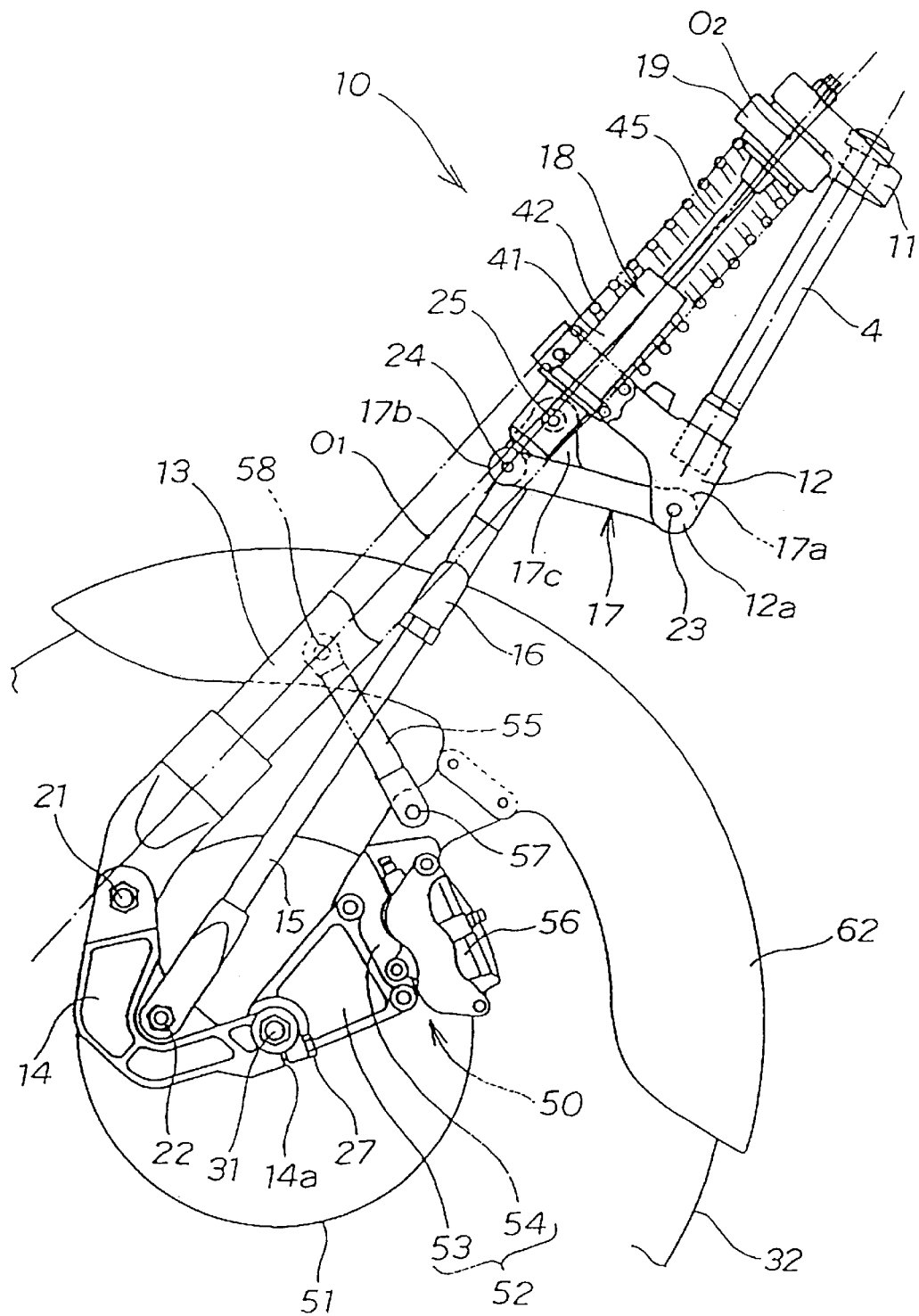
FIG. 2 is side view of a front wheel suspension of the present invention.

FIG. 2 is a side view of the front wheel suspension of the present invention. The front wheel suspension 10 is of a trailing arm type including the top bridge 11 mounted to the upper portion of the steering stem 4; a bottom bridge 12 mounted to the lower portion of the steering stem 4; front forked portions 13 having upper ends mounted to the top and bottom bridges 11 and 12; front wheel supporting arms 14 having front ends vertically swingably connected to the lower ends of the forwardly, downwardly extending front forked portions 13; push rods 15 having lower ends longitudinally swingably connected to middle points of the rearwardly, downwardly extending front wheel supporting arms 14; an upper link or arm 17 extending forwardly and capable of swinging in a vertical direction from the bottom bridge 12 to connect the upper ends of the upwardly extending push rods 15 to each other via a rod hanger 16; dampers 18 having lower ends connected to the upper link 17; and an upper bracket 19 mounted to the upper portions of the front forked portions 13 to connect the upper ends of the upwardly extending dampers 18 to each other. In FIG. 2, reference numerals 21 to 25 designate connecting pins.

In the trailing arm type front wheel suspension 10, a front wheel axle 31 can be mounted to the rear ends of the front wheel supporting arms 14 and a front wheel 32 is rotatably mounted to the axle 31.

In addition, a bolting method so-called a "slit-fastening method", is employed to tightly mount the axle 31 to each front wheel supporting arm 14. The slit-fastening method is performed by forming a slit 14a extending to a hole in which the axle 31 is to be fitted, and fastening the slit 14a portion with a bolt 27. While only the mounting of the left end of the axle 31 to the left front wheel supporting arm 14 by slit-fastening is shown in FIG. 2, the right end of the axle 31 is mounted to the right front wheel supporting arm 14 (not shown) by slit-fastening as well.

The above-described front wheel suspension 10 is characterized in that (1) in the side view, the front forked portion 13 is disposed in front of the steering stem 4 and the tilting angle of the front forked portion 13 is set to be smaller than that of the steering stem 4; and (2) in the side view, the center $0_1$ of the front forked portion 13 substantially corresponds to the center $0_2$ of the damper 18.

The damper 18 is of the exterior spring mounted type including a hydraulic damper 41 and a suspension spring 42 wound around the damper 41. As is apparent from FIG. 2, the outside diameter of the suspension spring 42, which is equivalent to the maximum diameter of the damper 18, is nearly equal to the diameter of the front forked portion 13.

A bracket 52 perpendicular to the axle 31 is vertically swingably mounted to the axle 31. The bracket 52 includes a first bracket 53 to be mounted to the axle 31, and a second bracket 54 to be mounted to the leading end of the first bracket 53. The leading end side of the second bracket 54 is connected to an intermediate portion of the front forked portion 13 in the longitudinal direction via a torque transmission link 55. Furthermore, a caliper 56 and a front fender 62 are mounted to the second bracket 54. The torque transmission link 55 is a rotation-stopper link which is vertically swingably connected at both ends thereof to the bracket 52 and the front forked portion 13 by means of connecting pins 57 and 58, respectively for stopping rotation of the bracket 52 as the link member.

Figure 3:
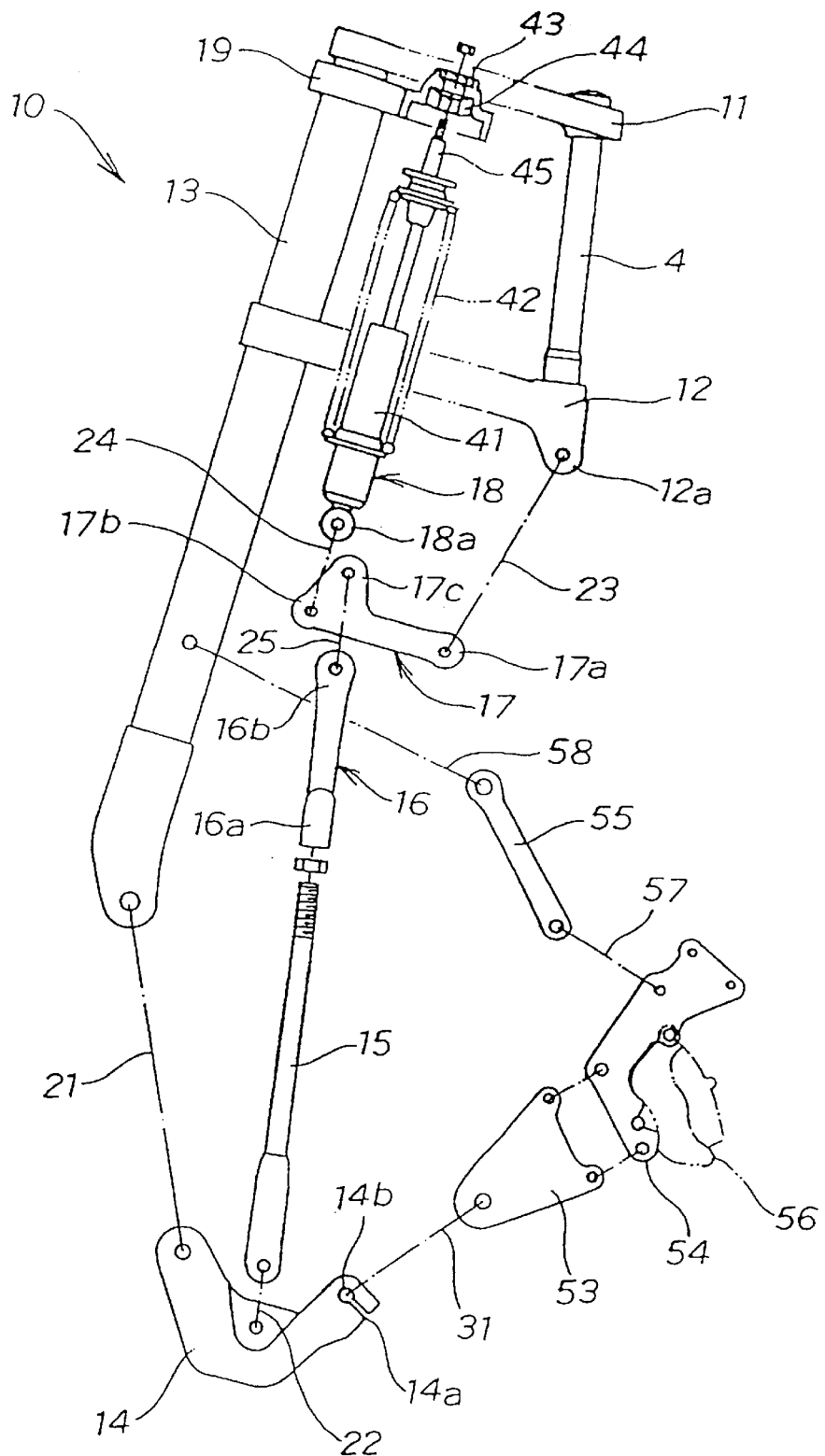
FIG. 3 is an exploded side view of the front wheel suspension of the present invention.

FIG. 3 is an exploded side view of the front wheel suspension of the present invention, showing the relationships of connection among respective members of the front wheel suspension 10.

In particular, as shown in FIG. 3, a connecting portion 12a is provided at the lower end of the bottom bridge 12; a rear end connecting portion 17a of the upper link 17 (also called a "crank") is vertically swingably connected to the connecting portion 12a; a lower end portion 18a of the damper 18 is vertically swingably connected to a front end connecting portion 17b of the upper link 17; and an upper connecting portion 16b of the rod hanger 16 is vertically swingably connected to an intermediate connecting portion 17c of the upper link 17. The intermediate connecting portion 17c is provided on half of the upper link 17 in the longitudinal direction and above the front end connecting portion 17b.

FIG. 3 also shows that the slit 14a of the front wheel supporting arm 14 extends to a fitting hole 14b in which the front wheel axle is to be fitted.

Figure 4:
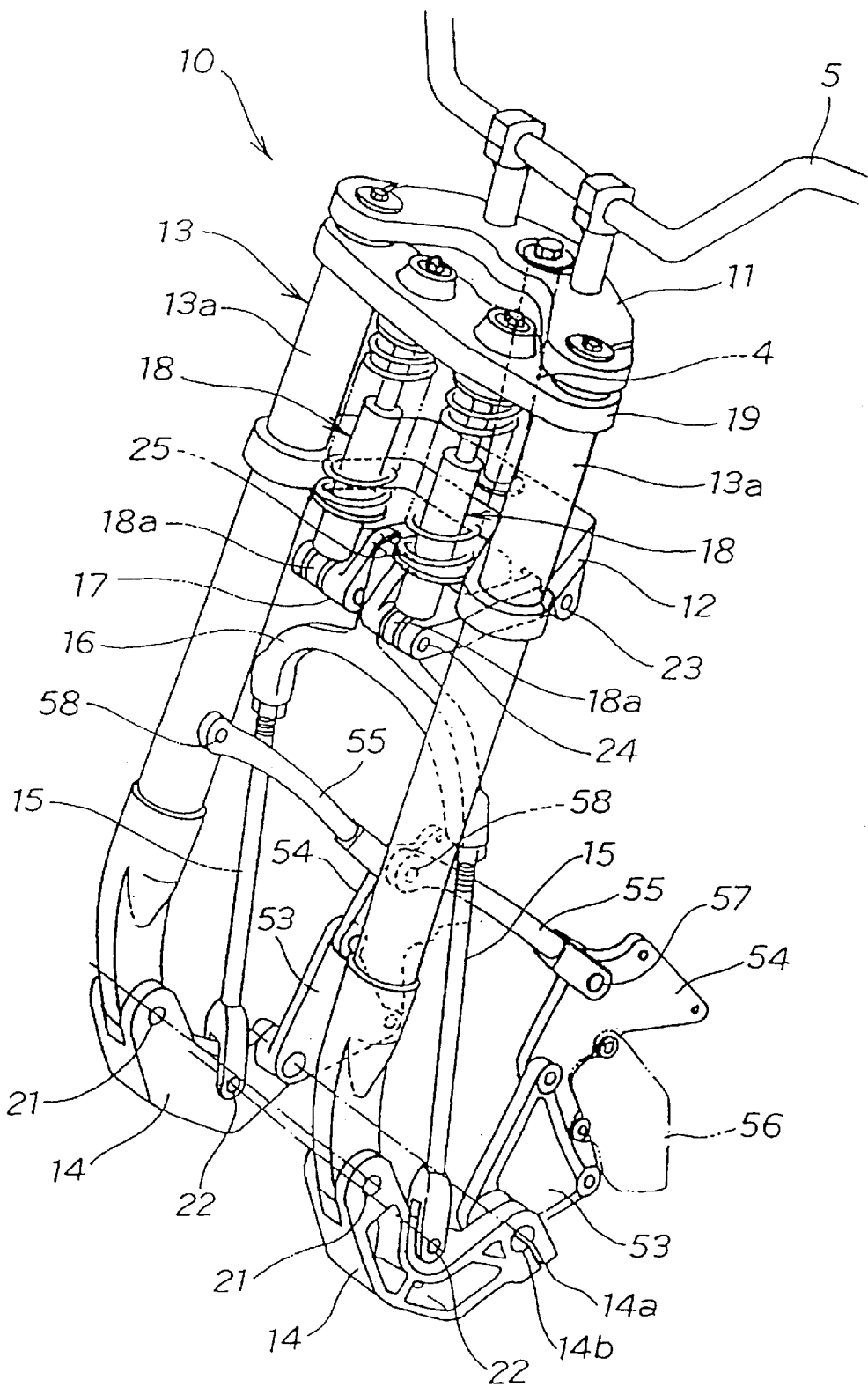
FIG. 4 is a perspective view of the front wheel suspension of the present invention.

FIG. 4 is a perspective view of the front wheel suspension of the present invention, showing that pipes (front forked pipes) 13a of the front forked portions 13, the front wheel supporting arms 14, the push rods 15, and the dampers 18, which are the components of the front wheel suspension 10, are paired on the right and left sides, respectively. Each of the top and bottom bridges 11 and 12 is formed into an approximately U-shape in plan view in order to not interfere with the right and left dampers 18. The first brackets 53, the second brackets 54, and the torque transmission link 55 are also paired on the right and left sides, respectively. The right and left torque transmission links 55 are slightly curved toward the center of the vehicular body in order to not interfere with the push rods 15. Each of the torque transmission links 55 may be made straight, if they do not interfere with the push rods 15.

Figure 5:
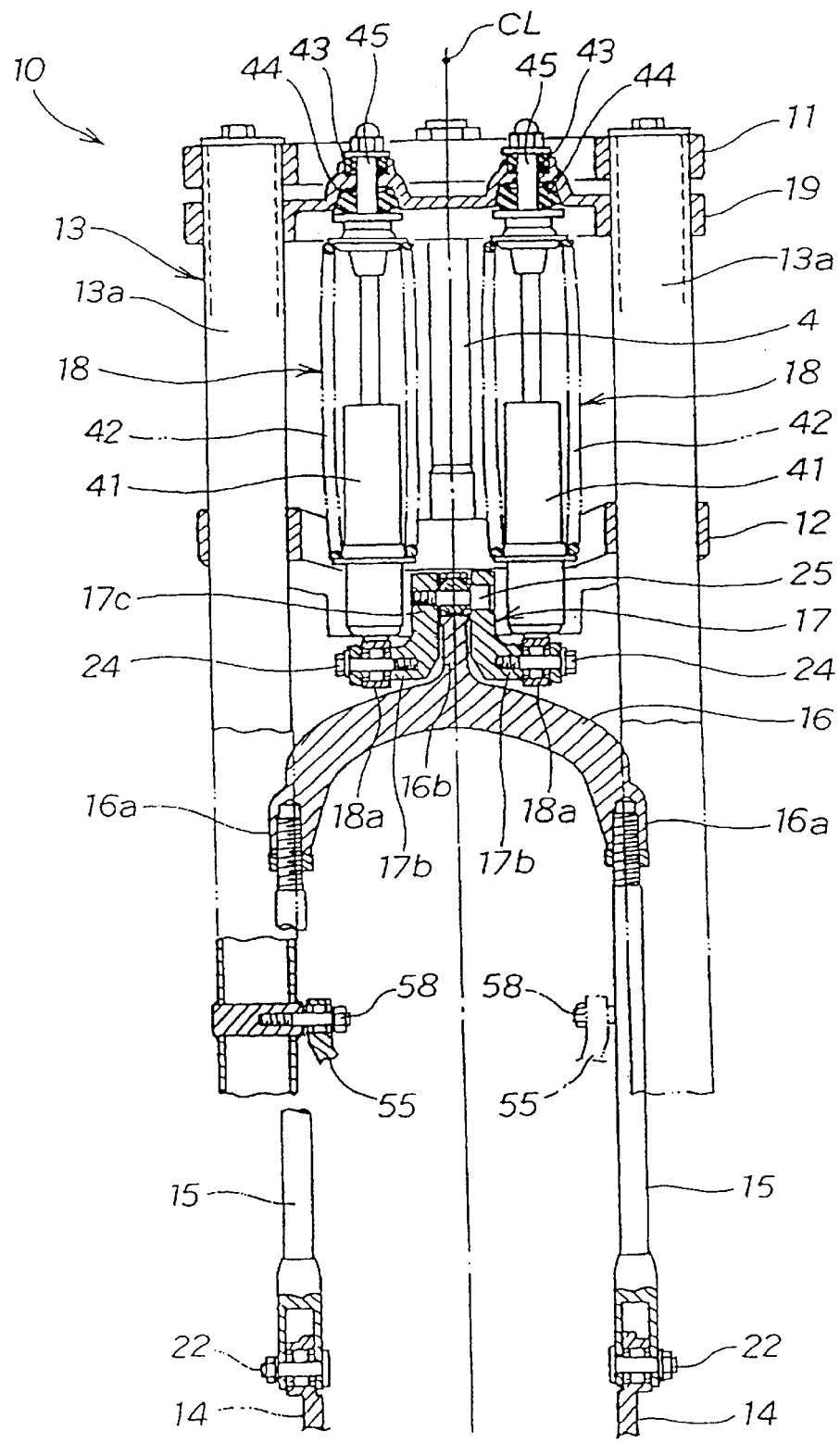
FIG. 5 is a sectional front view of an essential portion of the front wheel suspension of the present invention.

FIG. 5 is a sectional front view showing an essential portion of the front wheel suspension of the present invention. As is apparent from FIG. 5, the front wheel suspension 10 is symmetrical with respect to the body center CL.

The rod hanger 16, which is formed into an approximately inverse Y-shape in front view, includes right and left rod mounting portions 16a and a central upper connecting portion 16b integrated with the rod mounting portions 16a. The upper ends of the push rods 15 are screwed into the rod mounting portions 16a, and the upper link 17 is connected to the upper connecting portion 16b. The upper link 17 is a member for connecting the lower ends 18a of the right and left dampers 18 to each other.

The upper bracket 19 is a member disposed under the top bridge 11 in such a manner as to cross between the right and left front forked pipes 13a. The dampers 18 are connected to the top bridge 11 side by suspending damper rods 45 provided at the upper ends of the dampers 18 from the upper bracket 19 via upper cushion members 43 and lower cushion members 44 in such a manner that the damper rods 45 are swingable in all directions in plan view. The upper and lower cushion members 43 and 44 are made from rubber or the like. That is to say, the dampers 18 are not connected to the top bridge 11, but are connected via the upper bracket 19. It should be noted that the dampers 18 may be directly connected to the top bridge 11.

Figure 6:
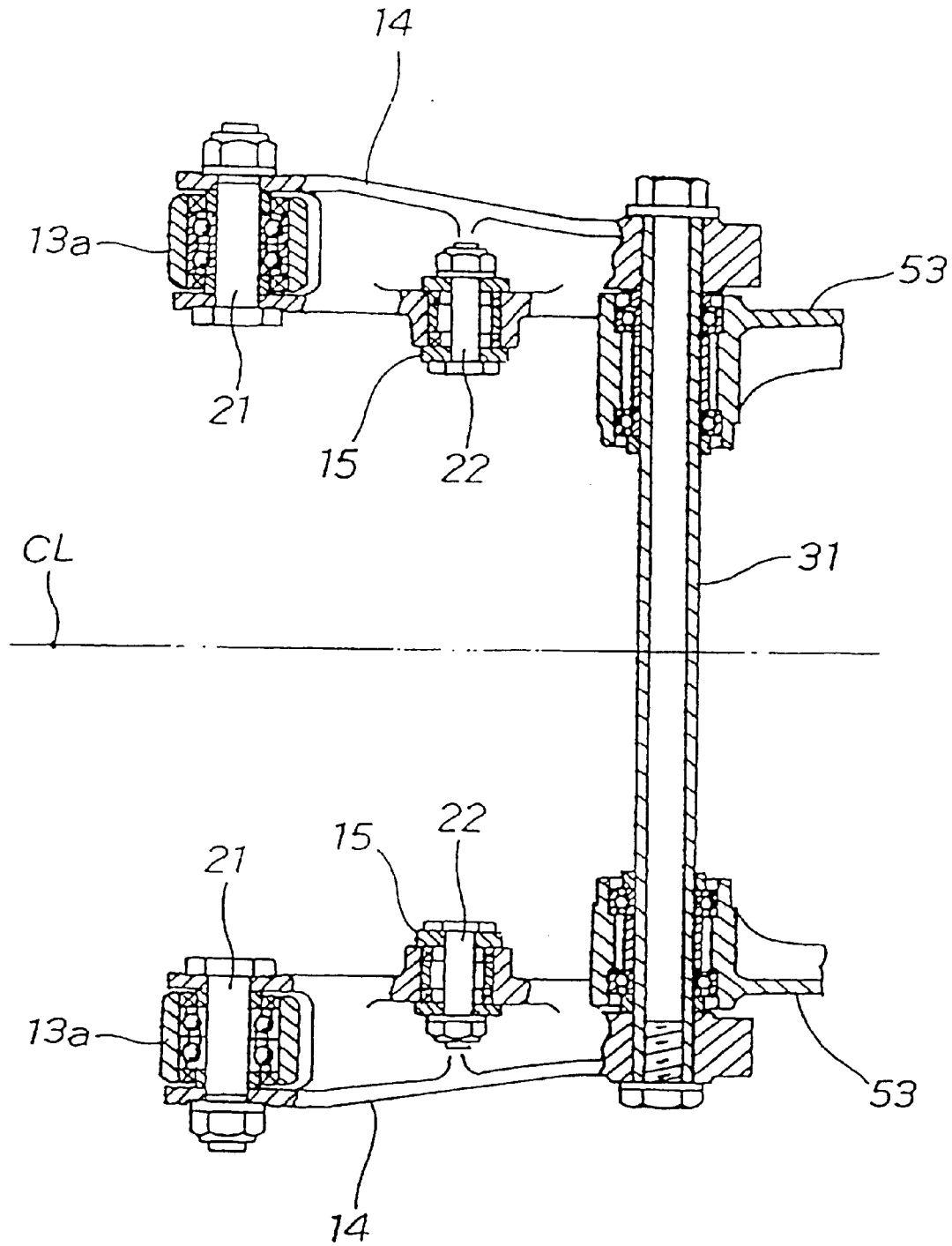
FIG. 6 is a sectional plan view of front wheel supporting arms of the present invention.

FIG. 6 is a sectional plan view of the front wheel supporting arms of the present invention, showing essential portions of the front wheel supporting arms in development based on respective connecting portions. As shown in FIG. 6, the front ends (one-ends) of the front wheel supporting arms 14 are connected to the front forked portions 13 by means of the connecting pins 21, the push rods 15 are connected to the intermediate portions of the front wheel supporting arms 14 by means of the connecting pins 22; the axle 31 is hung between the rear ends (the other ends) of the front wheel supporting arms 14; and the first brackets 53 are mounted to the axle 31.

The function of the front wheel suspension 10 having the above configuration will be described with reference to FIGS. 7 to 9.

Figure 7:
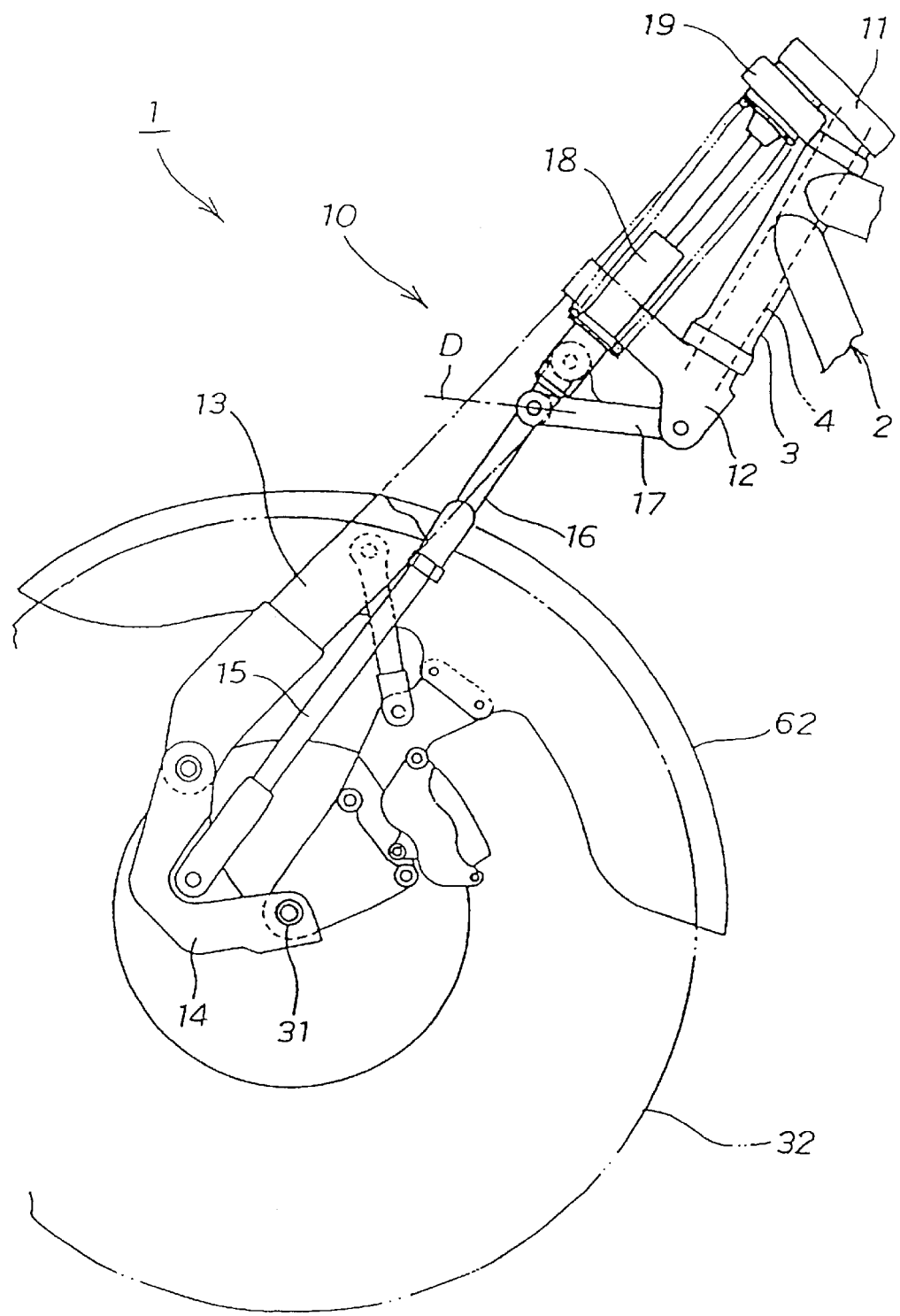
FIG. 7 is a functional view (No. 1) of the front wheel suspension of the present invention.

FIG. 7 is a functional view (No. 1) of the front wheel suspension of the present invention, showing a state of the front wheel suspension 10 when a downward load is not applied to the front wheel 32. In the state shown in FIG. 7, the front wheel 32 is located at the lower limit level, and the upper link 17 is located at a lower limit position D. As a result, each damper 18 is in the most stretched state. The front surface of the damper 18 is substantially the same as that of the front forked portion 13.

Figure 8:
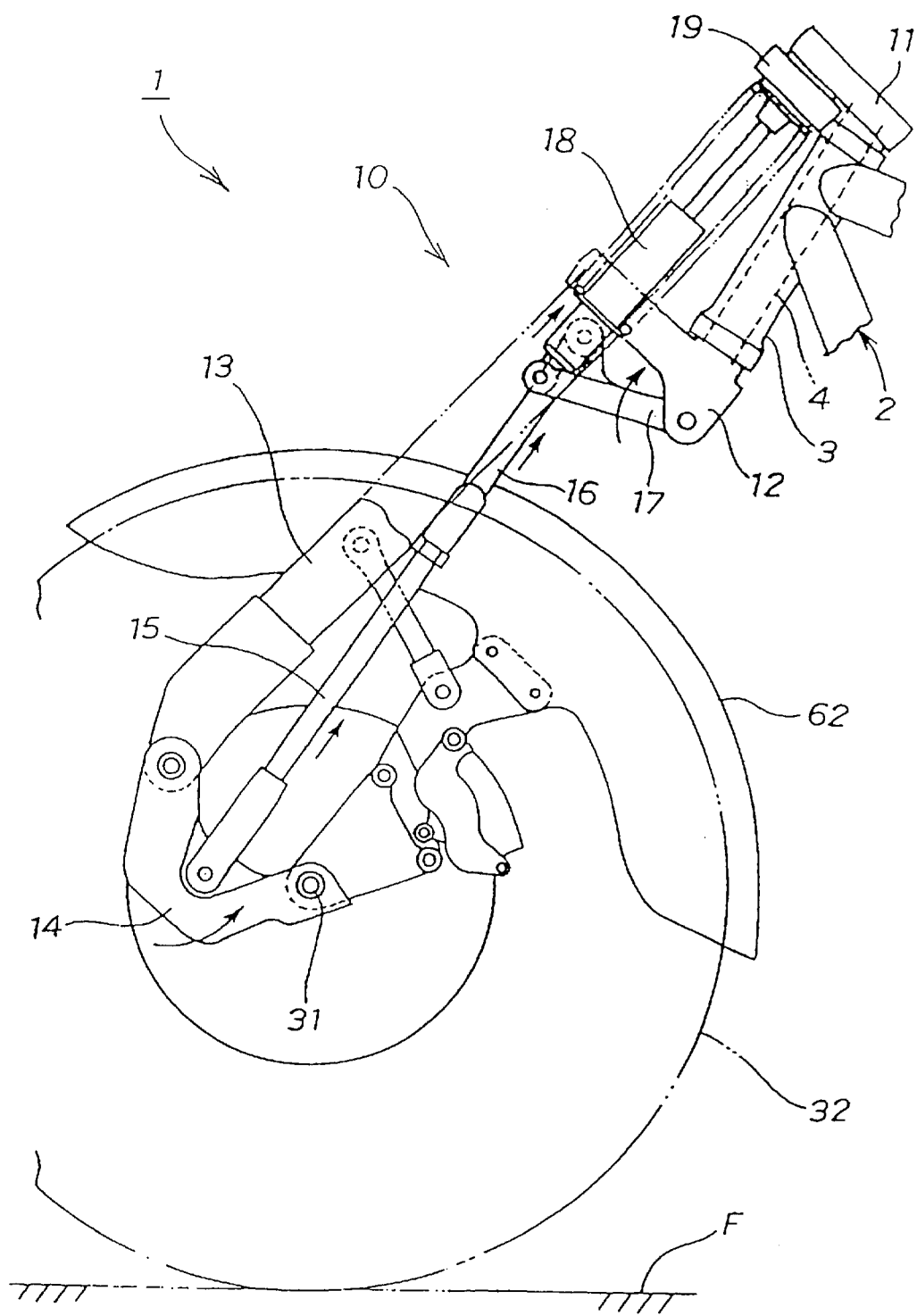
FIG. 8 is a functional view (No. 2) of the front wheel suspension of the present invention.

FIG. 8 is a functional view (No. 2) of the front wheel suspension of the present invention, showing a state of the front wheel suspension 10 when the front wheel 32 is located at an intermediate level, that is, a state in which each damper 18 is somewhat contracted from the state shown in FIG. 7.

When a downward light load equivalent to that of about the dead weight of the motorcycle 1 is applied to the body frame 2, such a load is transmitted to a road surface F by way of the head pipe 3→steering stem →top and bottom bridges 11 and 12 →front forked portions 13→front wheel supporting arms 14→axle 31 →and front wheel 32. At this time, the reaction force from the road surface F is transmitted to the dampers 18 by way of the front wheel 32 →axle 31→push rods 15 →rod hanger 16 →and upper link 17.

As a result, the front wheel supporting arms 14 are slightly upwardly swung from the state shown in FIG. 7 and thereby the push rods 15 and the rod hanger 16 are moved up, so that the front ends of the upper link 17 are upwardly swung. Accordingly, the dampers 18 are contracted by a stroke corresponding to the applied light load. At that time, the front surface of the damper 18 is substantially the same as that of the front forked portion 13.

Figure 9:
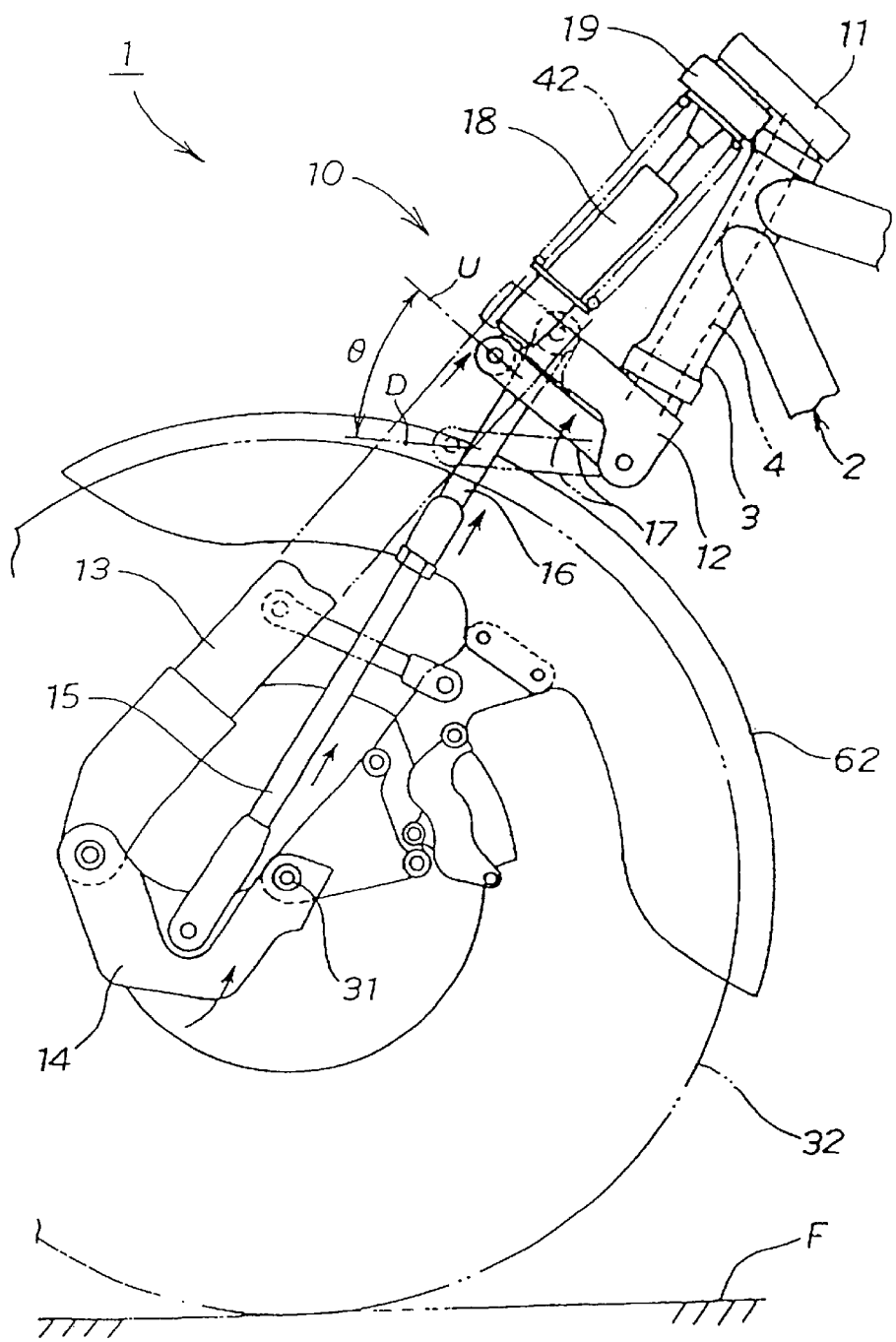
FIG. 9 is a functional view (No. 3) of the front wheel suspension of the present invention.

FIG. 9 is a functional view (No. 3) of the front wheel suspension of the present invention, showing a state of the front wheel suspension 10 when the front wheel 32 is located at the upper limit level, that is, a state in which each damper 18 is most contracted.

When a downward heavy load is applied to the body frame 2, such a load is transmitted to the road surface F in the same way as that described in FIG. 8. At that time, the reaction force from the road surface F is transmitted from the front wheel 32 to the dampers 18. As a result, the rear portions of the front wheel supporting arms 14 are further upwardly swung and thereby the push rods 15 and the rod hanger 16 are further moved up, so that the front end of the upper link 17 is upwardly swung to an upper limit position U. Accordingly, the dampers 18 are contracted by a stroke corresponding to the applied heavy load. At this time, the front surface of the damper 18 is nearly equal to the front surface of the front forked portion 13.

As is apparent from the above description, the front wheel suspension 10 is configured such that in the side view, the upper link 17 capable of swinging vertically extends forwardly from the bottom bridge 12, the lower ends of the dampers 18 are connected to the upper link 17; and the upper ends of the dampers 18 are connected to the upper bracket 19 on the top bridge 12 side. Referring to FIG. 9, the upper link 17 is vertically swung at a swing angle θ in the range from the lower limit position D shown by an imaginary line and the upper limit position U shown by a solid line. When the upper link 17 is swung, the dampers 18 are longitudinally swung with respect to the upper bracket 19.

Incidentally, the center of the damper 18 is set to substantially correspond to the center of the front forked portion 13, the outside diameter of the suspension spring 42, which is equivalent to the maximum diameter of the damper 18, is set to be nearly equal to the diameter of the front forked portion 13; and in the most contracted state of the damper 18, the upper link 17 is located at the upper limit position U which is substantially perpendicular to the front forked portion 13 in side view. Accordingly, the damper 18 does not protrude forwardly from the front forked portion 13 in the range of the swing angle θ of the upper link 17, that is, in the range of upward/downward movement of the front wheel 32.

Figure 10:
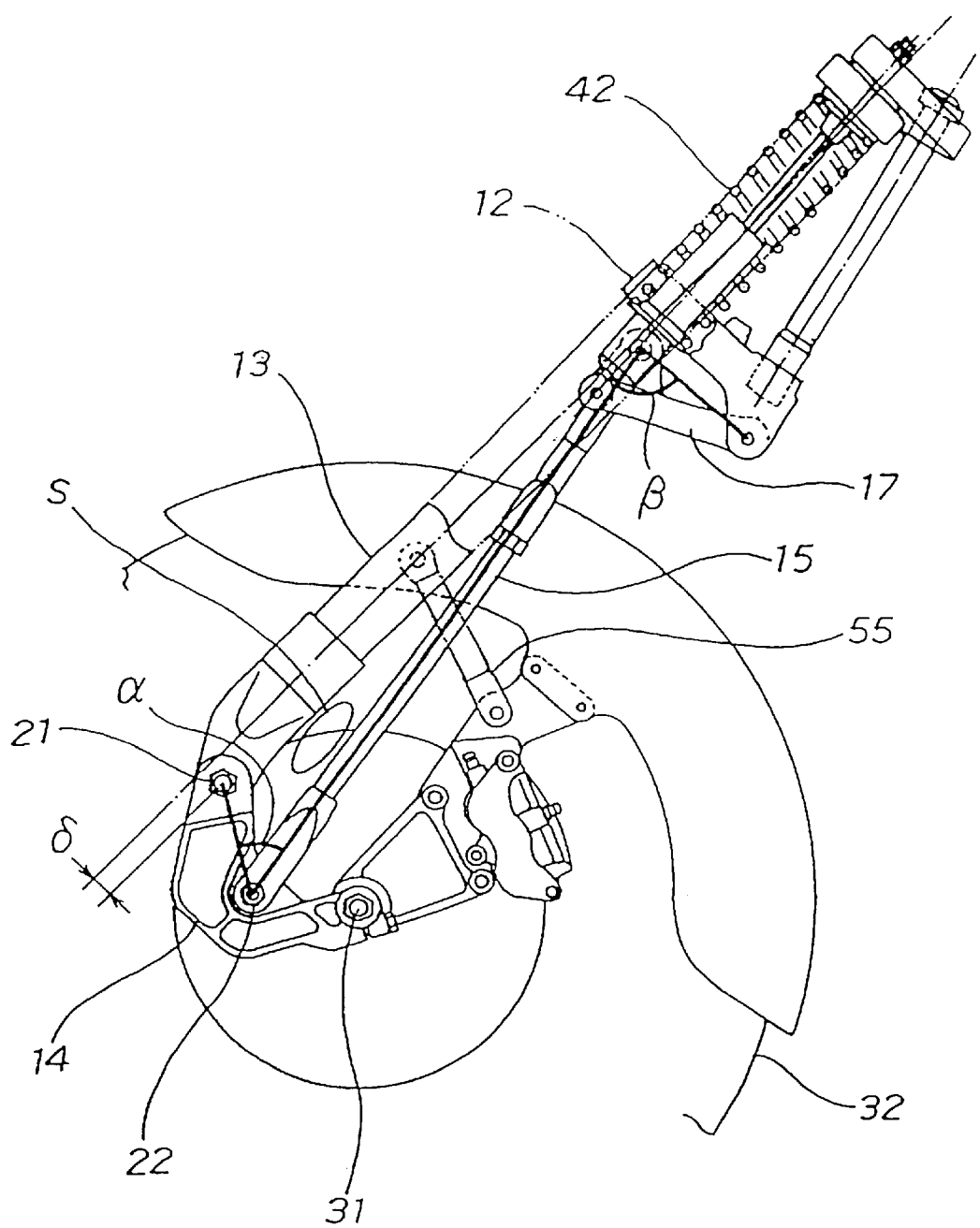
FIG. 10 is a view illustrating that a link structure of the present invention is a Z-shaped link.

FIG. 10 is a view illustrating that the link structure of the present invention is a Z-shaped link. In FIG. 10, the front wheel supporting arm 14 is swingably mounted on the front forked portion 13; the axle 31 of the front wheel 32 is mounted to the leading end (right end in the figure) of the front wheel supporting arm 14; the push rod 15 is erected from the middle point of the front wheel supporting arm 14; the upper end of the push rod 15 is connected to one end or in the vicinity of the upper link 17; the other end (right end) of the upper link 17 is swingably connected to the bottom bridge 12; and the upper link 17 is connected to the lower end of the suspension spring 42, whereby when the vehicular body is viewed from a side surface thereof, one end of the upper link 17 extends to a position substantially overlapped with the front forked portion 13. With this configuration, as shown by a thick line in FIG. 10, the front wheel supporting arm 14, the push rod 15, and the upper link 17 constitute a Z-shaped link.

As is apparent from FIG. 10, the Z-shaped link shown by the thick line is a non-parallel link in which an angle α is different from an angle β. Since these angles α and β can be freely set as needed and the dimensions (lengths) of the front wheel supporting arms 14 and the upper link 17 can be freely set, it is possible to increase the degree of freedom in design of the suspension spring 42.

Furthermore, since the upper portion of the push rod 15 is allowed to cross the front forked portion 13, it can be made as close to the front forked portion 13 as possible. This makes it possible to improve the external appearance of the front wheel suspension without complicating the structure of the front forked portion 13 and its vicinity, and decrease the moment of inertia around the front forked portion 13 and hence to improve the steering.

As a further feature of the present invention, the connecting pin (pivot) 21 for mounting the front wheel supporting arm 14 to the front forked portion 13 is offset toward the rear wheel side from the center of the front forked portion 13 by a value δ. As a result, it is possible to suitably ensure a space S between the front forked portion 13 and the lower portion of the push rod 15 and hence to easily dispose a suspension part such as the torque transmission link 55 in the space S.

Next, the shape and function of the front wheel supporting arm 14 will be described with reference to FIGS. 11 to 13.

Figure 11:
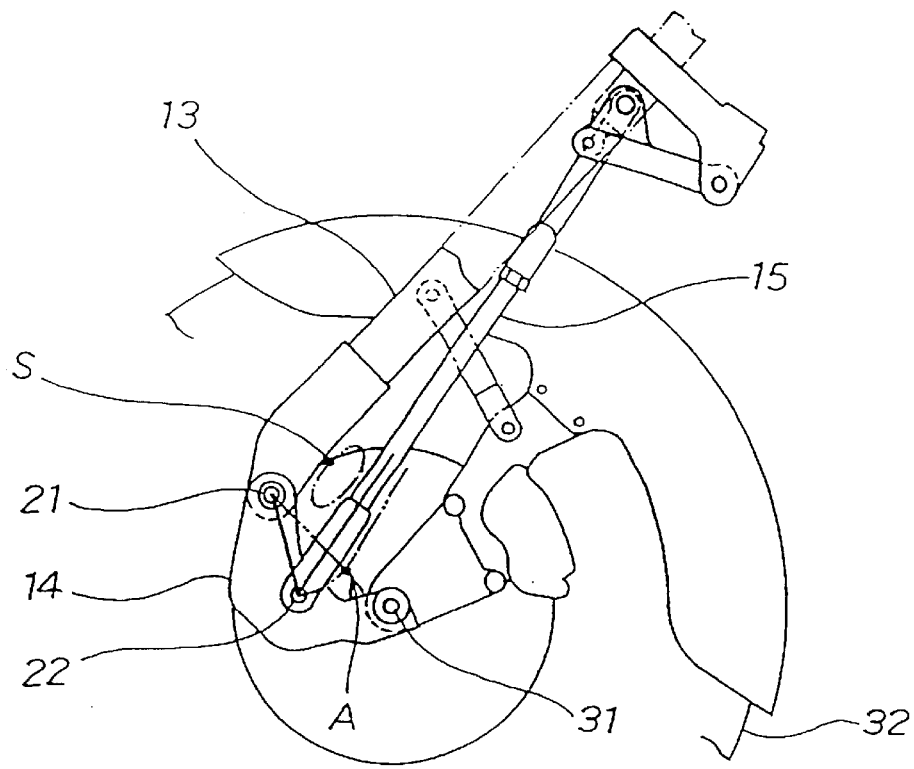
FIG. 11 is a schematic view of the front wheel suspension including downwardly projecting front wheel supporting arms.

FIG. 11 is a schematic view, based on FIG. 10, showing the front wheel suspension including downwardly projecting front wheel supporting arms. As shown in FIG. 11, a front wheel supporting arm 14 is formed into a downwardly projecting V-shape. In the state shown in FIG. 11, a sufficiently large space S is present between the front forked portion 13 and the push rod 15. When the front wheel 32 is relatively moved up from such a state, the connecting pin 22 is moved to a point A along a circular-arc centered at the pivot 21. As a result, the space S is enlarged. Accordingly, a suspension part can be easily disposed in the space S.

Figure 12:
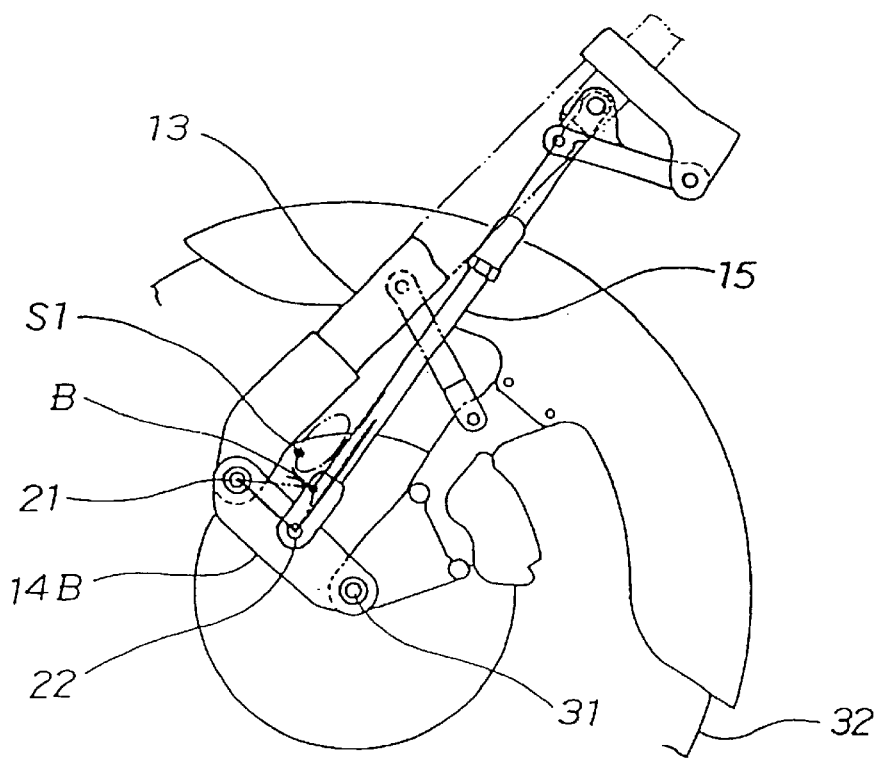
FIG. 12 is a schematic view of the front wheel suspension including bar-like front wheel supporting arms.

FIG. 12 is a schematic view of the front wheel suspension including bar-like front wheel supporting arms. As shown in FIG. 12, a front wheel supporting arm 14B is formed into a simple bar-like shape in which the pivot 21, the connecting pin 22, and the axle 31 are aligned substantially in a straight line. In the state shown in FIG. 12, a space S1 is present between the front forked portion 13 and the push rod 15. When the front wheel 32 is relatively moved up from such a state, the connecting pin 22 is moved to a point B along a circular-arc centered at the pivot 21. As a result, the space S1 becomes narrower, and accordingly, care should be taken when disposing a suspension part in the space S1.

Figure 13:
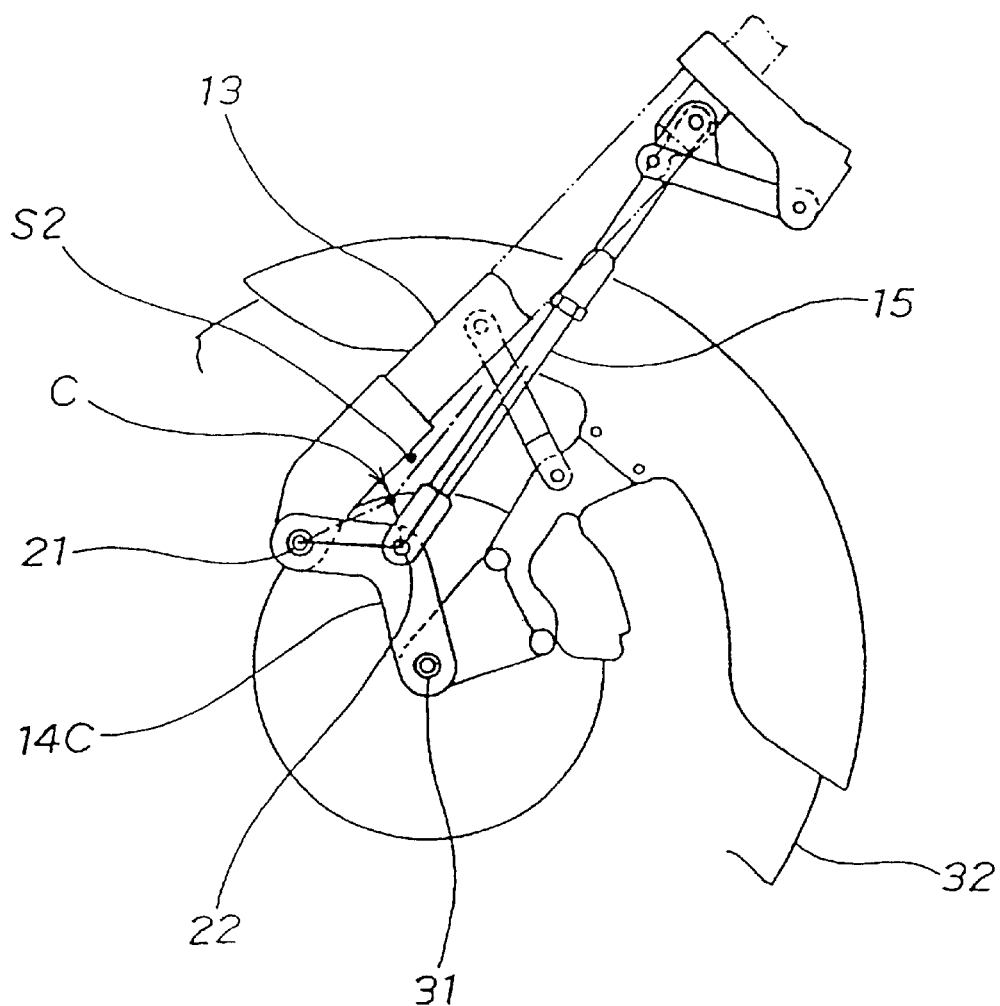
FIG. 13 is a schematic view of the front wheel suspension including upwardly projecting front wheel supporting arms.

FIG. 13 is a schematic view of the front wheel suspension including upwardly projecting front wheel supporting arms. As shown in FIG. 13, a front wheel supporting arm 14C is formed into an upwardly projecting inverse V-shape. In the state shown in FIG. 13, a space S2 is present between the front forked portion 13 and the push rod 15. When the front wheel 32 is relatively moved up from such a state, the connecting pin 22 is moved to a point C along a circular-arc centered at the pivot 21. As a result, the space S2 becomes significantly narrower, and accordingly, special care should be taken when disposing a suspension part in the space S2.

From the above description with reference to FIGS. 11 to 13, it becomes apparent that from the viewpoint of ensuring a sufficiently large space, the downwardly projecting V-shaped front wheel supporting arm 14 (shown in FIG. 11) is more preferable than the upwardly projecting inverse V-shaped front wheel supporting arm 14C (shown in FIG. 13), and the bar-like front wheel supporting arm 14B (shown in FIG. 12) is intermediate therebetween.

Figure 14:
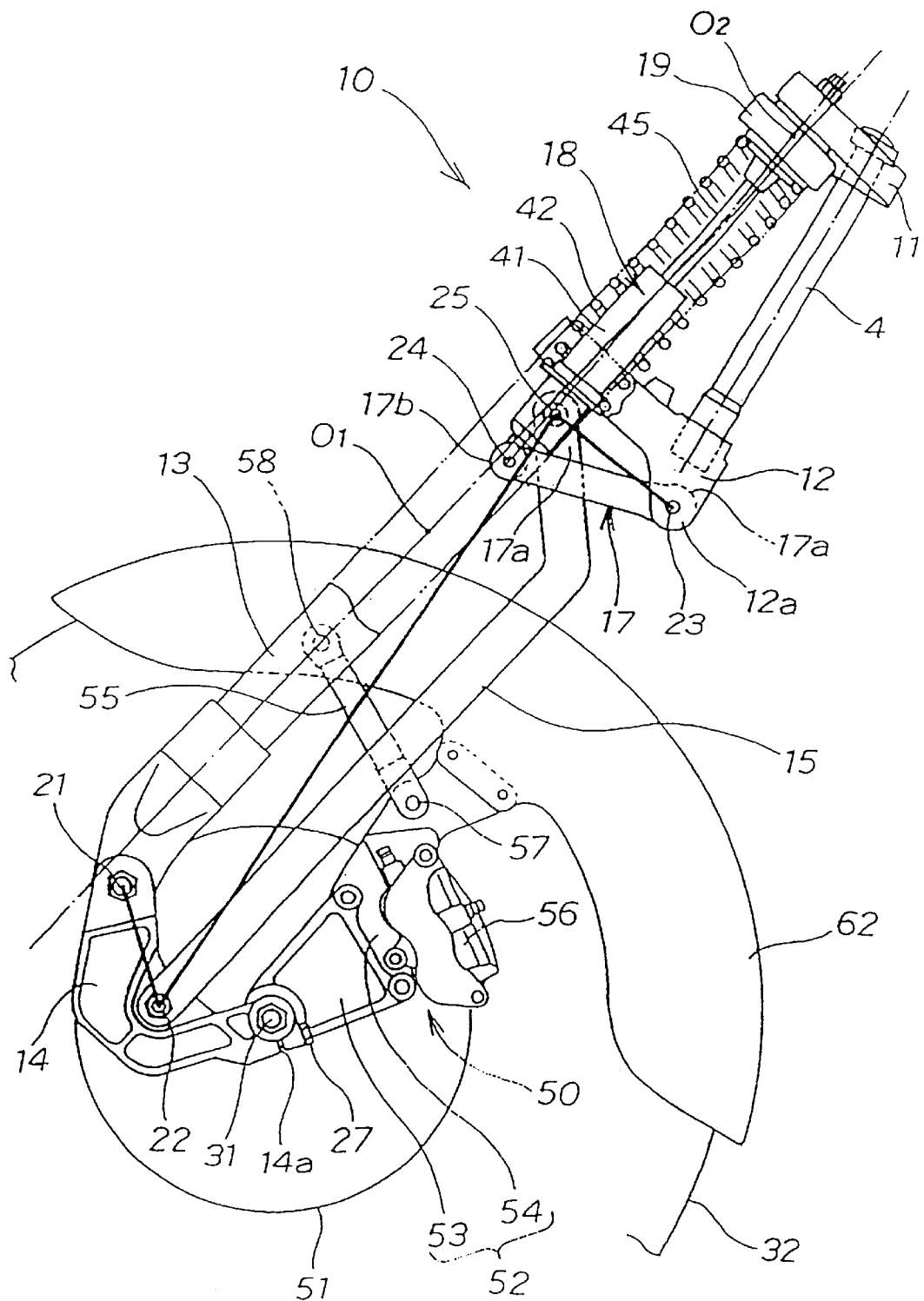
FIG. 14 is a view showing a variation of the embodiment shown in FIG. 2.
Figure 15:
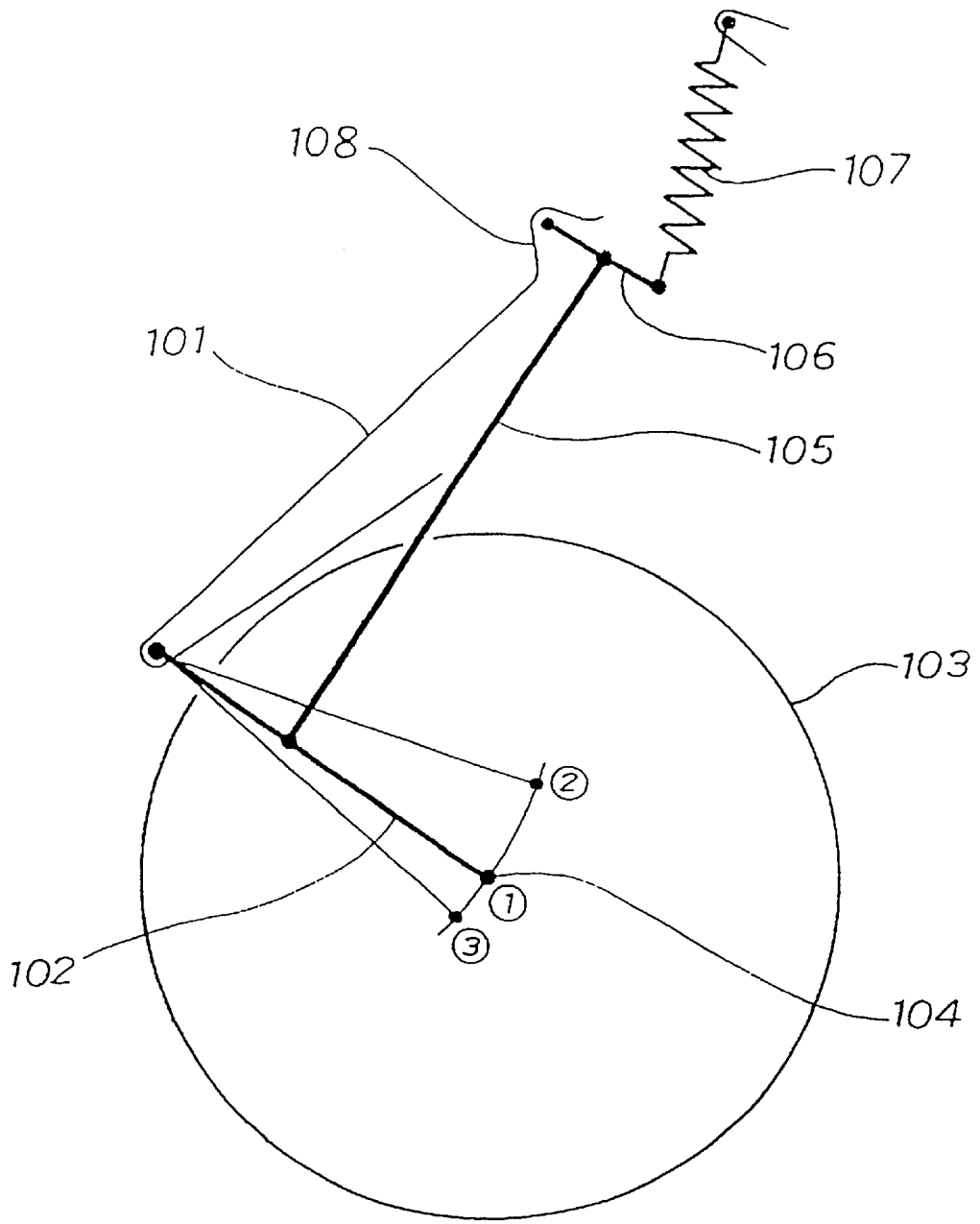
FIG. 15 is a view showing the principle of a related art typical bottom link type suspension.

FIG. 14 is a view showing a variation of the embodiment shown in FIG. 2. A front wheel suspension 10 shown in FIG. 14 has the same configuration as that shown in FIG. 2 except that a push rod 15 is formed into a non-straight shape, concretely, curved into an asymmetrical V-shape. In FIG. 14, parts corresponding to those shown in FIG. 2 are designated by the same characters and explanation thereof is omitted.

Even for the structure using the curved push rod, as shown in FIG. 14, a thick line connecting the pivot 21, the connecting pin 22 at the lower end of the push rod 15, the connecting pin 25 at the upper end of the push rod 15, and the connecting pin 23 at the base of the upper link 17 to each other constitutes a Z-shaped link.

Accordingly, the expression "each of said front supporting arms, each of said push rods, and said upper link constitute a Z-shaped link" in the present invention also means that the Z-shaped link is constituted by connecting the pivot 21, the connecting pin 22 at the lower end of the push rod 15, the connecting pin 25 at the upper end of the push rod 15, and the connecting pin 23 at the base of the upper link 17 to each other.

While the present invention has been described by example of the trailing type suspension in this embodiment, the Z-shaped link structure and the offset of the pivot by the value δ according to the present invention may be applied to the leading type suspension. Furthermore, the front wheel suspension of the present invention, which is suitably applied to a motorcycle, can be also adopted for a two-wheeled vehicle (bicycle) on which no engine is mounted.

Figure 16:
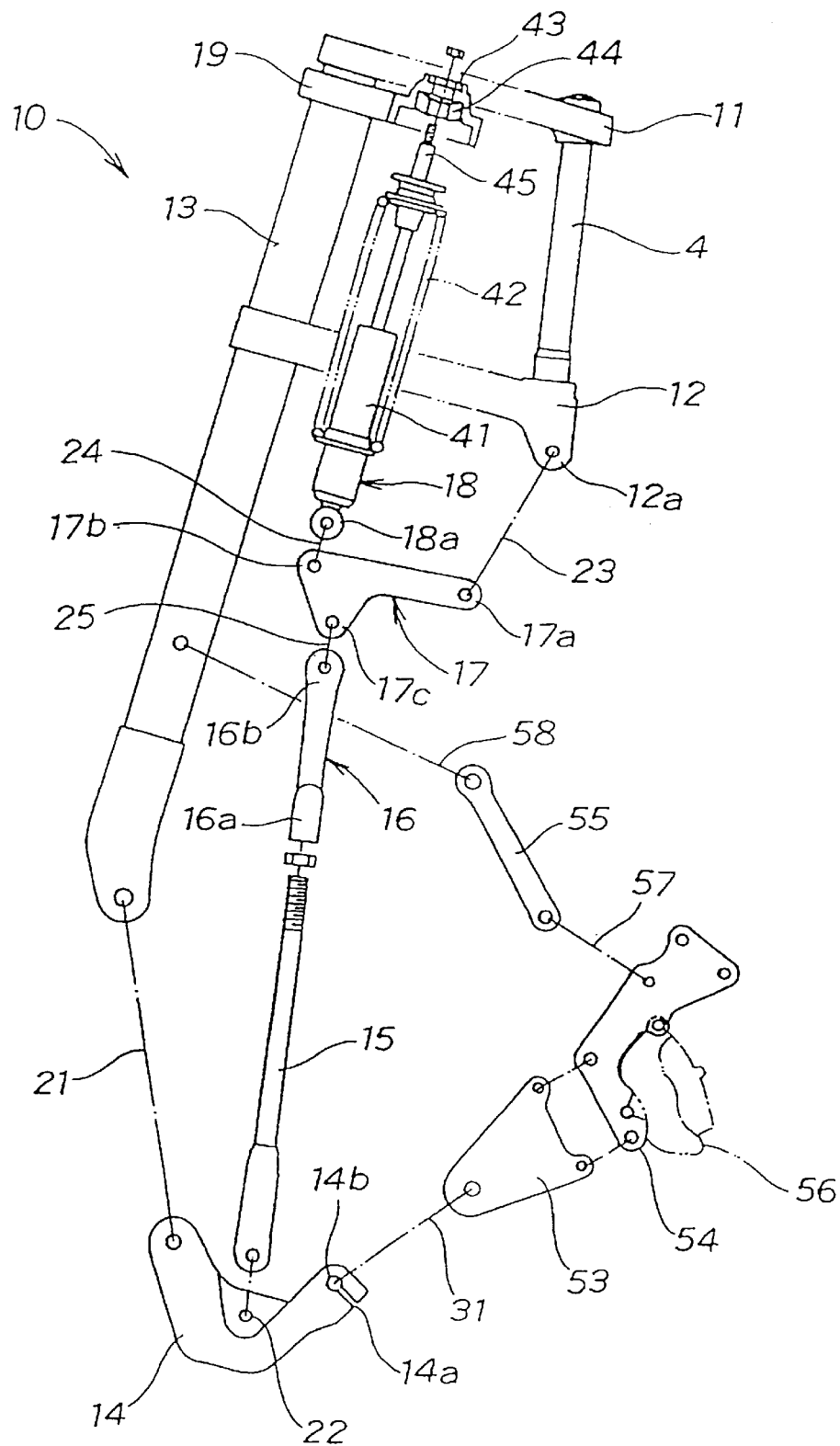
FIG. 16 is an exploded side view showing a variation of the front wheel suspension of the present invention.

FIG. 16 is an exploded side view showing a variation of the front wheel suspension of the present invention. A front wheel suspension 10 in this variation has the same configuration as that shown in FIG. 3 except that the arm 17 is vertically inversely mounted. Even in this variation, the basic operation is the same as that of the front wheel suspension shown in FIG. 3. In this variation, parts corresponding to those in the front wheel suspension shown in each of FIGS. 1 to 9. Therefore, an explanation thereof is omitted.

The embodiment of the present invention may be variably changed as follows:

(1) The front wheel suspension 10 may be configured to be of not only the above-described trailing arm type, but also a leading arm type, insofar as it is of the bottom link type. In the case of adopting the leading arm type, the front wheel supporting arm may be longitudinally, inversely mounted on the lower end of the front forked portion 13.

(2) The front wheel suspension 10 may not be necessarily symmetrical with respect to the body center CL.

(3) The type and dimension of the damper 18 may be freely selected. Although the dampers 18 are paired on the right and left sides in this embodiment, the present invention is not limited thereto. For example, only one damper may be provided. In this case, it may be desirable to dispose one damper 18 at the center of the vehicular body. Furthermore, the outside diameter of the suspension spring 42 of the damper 18 is not necessarily equal to the diameter of the front forked portion 13.

(4) The rod hanger 16 is not necessarily formed into an approximately inverse Y-shape in a front view, insofar as it is connected to the rods 15 and is vertically swingably connected to the arm 17. The mounting structure of each rod 15 to the rod hanger is not limited to the screwing structure in this embodiment. For example, each rod may be mounted to the rod hanger 16 by welding or caulking, or integrally formed with the rod hanger 16.

(5) In place of provision of the rod hanger 16, the right and left rods 15 may be directly connected to the arm 17.

(6) The front brake 50 may be provided on each of the right and left sides of the front wheel 32, or may be provided on either the right or left side of the front wheel 32. If one front brake 50 is provided on either the right or the left side of the front wheel 32, in such a case, the brake disk 51 may be provided only for the associated side.

The bottom link type front wheel suspension according to the first aspect of the present invention is configured such that the arm vertically swingably extends forwardly from the bottom bridge, and the lower ends of the dampers are connected to the arm and the upper ends of the dampers are connected to the top bridge side. Furthermore, the center of the damper substantially corresponds to the center of the front forked portion in a side view, whereby the dampers are not protruded forwardly from the front forked portions. As a result, a space can be provided in front of the front forked portions, for accommodating accessories such as a headlamp and a meter with ease in front of the front forked portions by making use of the space. Furthermore, since the dampers are not protruded forwardly from the front forked portions, the external appearance of the motorcycle can be enhanced.

The front wheel suspension according to the second aspect of the present invention, which is basically of a bottom link type, has a Z-shaped link structure including each of the front wheel supporting arms, each of the push rods, and the upper link. Accordingly, it is possible to make the upper portion of the push rod closer to the front forked portion, and hence to improve the external appearance of the front wheel suspension without complicating the structure of the front forked portion and its vicinity.

Furthermore, since the front wheel suspension has a Z-shaped link structure, it is possible to freely select the lengths, mounting postures, and the relative angles of the constituent members, and hence to increase the degree of freedom in design of suspension spring.

The front wheel suspension according to the third aspect of the present invention includes a pivot for mounting the front wheel supporting arm to the front forked portion offset to the rear wheel side from the center of the front forked portion. Since the pivot of the front forked portion is offset to the rear wheel side, the lower portion of the push rod can be separated from the front forked portion to ensure a space for containing a part of the front wheel suspension.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bottom link type front wheel suspension for a motorcycle, comprising:
   a steering stem rotatably mountable in a head pipe of the motorcycle;
   a top bridge and a bottom bridge mounted on upper and lower portions of said steering stem, respectively;
   front forked portions having upper ends thereof mounted to said top and bottom bridges;
   front wheel supporting arms having first ends connected to lower ends of said front forked portions;
   rods having lower ends connected to middle points of said front wheel supporting arms;
   an arm, said arm being vertically swingable and extending forwardly from said bottom bridge, said arm being connected to the upper ends of said rods; and
   dampers having lower ends connected to said arm and upper ends connected to said top bridge, wherein a center of said damper substantially corresponds to a center of said front forked portion when viewed from the side.

2. The bottom link type front wheel suspension for a motorcycle according to claim 1, wherein said arm includes a rear end connecting portion for connecting to a connecting portion of said bottom bridge, said connecting portion of said bottom bridge being located at a rearmost end of said bottom bridge.

3. The bottom link type front wheel suspension for a motorcycle according to claim 2, wherein said arm includes a front end connecting portion for connecting to said dampers and an intermediate connecting portion for connecting to said rods.

4. A front wheel suspension for a two-wheeled vehicle, comprising:
   front wheel supporting arms swingably mounted to front forked portions;
   an axle of a front wheel, said axle being mounted to ends of said front wheel supporting arms;
   push rods erected from middle points of said front wheel supporting arms, upper ends of said push rods being connected to one end or in the vicinity of an upper link disposed near a bottom bridge, another end of said upper link being swingably mounted to said bottom bridge; and
   said upper link is connected to the lower end of a suspension spring, whereby when a vehicular body is viewed from a side surface thereof, one end of said upper link extends to a position substantially overlapping with said front forked portions, and thereby each of said front wheel supporting arms, each of said push rods, and said upper link together form a Z-shaped link.

5. The front wheel suspension for a two-wheeled vehicle according to claim 4, wherein a pivot for mounting each of said front wheel supporting arms to said front forked portion is offset to a rear wheel side from a center of said front forked portion.

6. A motorcycle, comprising:
   a body frame including a head pipe mounted thereon;
   a steering stem rotatably mounted in said head pipe;
   a top bridge and a bottom bridge mounted on upper and lower portions of said steering stem, respectively;
   front forked portions having upper ends thereof mounted to said top and bottom bridges;
   front wheel supporting arms having first ends connected to lower ends of said front forked portions;
   rods having lower ends connected to middle points of said front wheel supporting arms;
   an arm, said arm being vertically swingable and extending forwardly from said bottom bridge, said arm being connected to the upper ends of said rods; and
   at least one damper, each damper having a lower end connected to said arm and an upper end connected to said top bridge, wherein a center of said damper substantially corresponds to a center of said front forked portion when viewed from the side.

7. The motorcycle according to claim 6, wherein said arm includes a rear end connecting portion for connecting to a connecting portion of said bottom bridge, said connecting portion of said bottom bridge being located at a rearmost end of said bottom bridge.

8. The motorcycle according to claim 7, wherein said arm includes a front end connecting portion for connecting to said damper and an intermediate connecting portion for connecting to said rods.

9. The motorcycle according to claim 6, wherein said arm is connected to a lower end of a suspension spring, and when the body frame is viewed from a side surface thereof, one end of said arm extends to a position substantially overlapping with said front forked portions, and thereby each of said front wheel supporting arms, each of said rods, and said arm together form a Z-shaped link.

10. The motorcycle according to claim 9, wherein a pivot for mounting each of said front wheel supporting arms to said front forked portion is offset to a rear wheel side from a center of said front forked portion.

* * * * *